(12) United States Patent
Mitchell

(10) Patent No.: US 12,107,758 B2
(45) Date of Patent: Oct. 1, 2024

(54) LIMITING LAYER-2 MESH FLOODING

(71) Applicant: Cisco Technology, Inc., San Jose, CA (US)

(72) Inventor: Albert Mitchell, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 17/865,643

(22) Filed: Jul. 15, 2022

(65) Prior Publication Data

US 2024/0022506 A1  Jan. 18, 2024

(51) Int. Cl.
*H04L 45/00* (2022.01)
*H04L 12/46* (2006.01)
*H04L 45/64* (2022.01)
*H04L 45/74* (2022.01)
*H04L 47/12* (2022.01)

(52) U.S. Cl.
CPC .......... *H04L 45/32* (2013.01); *H04L 12/4645* (2013.01); *H04L 45/64* (2013.01); *H04L 45/66* (2013.01); *H04L 45/74* (2013.01); *H04L 47/12* (2013.01)

(58) Field of Classification Search
None
See application file for complete search history.

(56) References Cited

U.S. PATENT DOCUMENTS

| | | | |
|---|---|---|---|
| 7,756,146 B2 | 7/2010 | Hato et al. | |
| 7,877,483 B1 | 1/2011 | Finn | |
| 8,724,452 B2 | 5/2014 | Nakash | |
| 9,450,893 B2 | 9/2016 | Kuo et al. | |
| 9,768,980 B2 | 9/2017 | Subramaniyam et al. | |
| 10,135,627 B2 | 11/2018 | Tiruveedhula et al. | |
| 10,367,730 B2 | 7/2019 | Dunbar et al. | |
| 10,447,652 B2 | 10/2019 | Chandrashekhar et al. | |
| 2009/0016214 A1 | 1/2009 | Alluisi et al. | |
| 2022/0094632 A1 | 3/2022 | Chen et al. | |
| 2023/0327985 A1* | 10/2023 | Bandekar | H04L 45/66 709/238 |

OTHER PUBLICATIONS

"Frame Replication and Elimination for Reliability", IEEE Standard for Local and Metropolitan Area Network, Std 802.1CB™, 2017, 102 pages, IEEE Standards Association, New York.

(Continued)

*Primary Examiner* — Christine T Duong
(74) *Attorney, Agent, or Firm* — BEHMKE INNOVATION GROUP LLC; James M. Behmke; James J. Wong

(57) ABSTRACT

According to one or more embodiments of the disclosure, an edge node of a virtual overlay for a Layer-2 mesh receives a new flow notification that indicates a destination address for a new flow in the Layer-2 mesh. The virtual overlay is configured to flood replicated frames of the new flow throughout the virtual overlay. The edge node makes a local match between the destination address indicated by the new flow notification and a local address table of the edge node. The edge node sends, based on the local match, a match notification that causes other nodes in the virtual overlay to stop flooding replicated frames of the new flow.

20 Claims, 12 Drawing Sheets

(56) References Cited

OTHER PUBLICATIONS

"Spanning Tree Protocol", online: https://en.wikipedia.org/wiki/Spanning_Tree_Protocol, Jun. 5, 2022, accessed Jul. 8, 2022, 10 pages, Wikimedia Foundation, Inc.

"High-Availability Seamless Redundancy", online: https://en.wikipedia.org/wiki/High-availability_Seamless_Redundancy, Feb. 19, 2022, accessed Jul. 8, 2022, 4 pages, Wikimedia Foundation, Inc.

"Parallel Redundancy Protocol", online: https://en.wikipedia.org/wiki/Parallel_Redundancy_Protocol, Jun. 24, 2022, accessed Jul. 8, 2022, 3 pages, Wikimedia Foundation, Inc.

Varga, Balazs, "DetNet: Basic Concept and Services", TSN Joint Workshop, IETF/IEEE 802, Nov. 11, 2018, 16 pages, Ericsson Research, Bangkok, Thailand.

Thubert, et al., "Reliable and Available Wireless Architecture", Internet Draft: draft-ietf-raw-architecture-05, Jul. 4, 2022, 42 pages, IETF Trust.

Finn, et al., "Deterministic Networking Architecture", RFC 8655, Oct. 2019, 38 pages, IETF Trust.

Thubert, et al., "Reliable and Available Wireless Architecture", online: https://www.ietf.org/archive/id/draft-ietf-raw-architecture-03.html#name-the-raw-conceptual-model, Jan. 14, 2022, 42 pages, IETF.org.

Paruchuri, et al., "Optimized Flooding Protocol for Ad hoc Networks", online: https://arxiv.org/ftp/cs/papers/0311/0311013.pdf, 2003, 10 pages, arXiv.org.

Thubert, et al., "Reliable and Available Wireless Architecture", online: https://www.ietf.org/archive/id/draft-ietf-raw-architecture-04.html#name-routing-time-scale-vs-forwa, Mar. 4, 2022, 23 pages, IETF Trust.

Cuaresma, Michael, "Turbo Ring and Turbo Chain", May 2014, 6 pages, Quantum Automation Tech Corner, Anaheim, CA.

"Configuration of HRP Rings with Standby Link", HRP-Standby, Entry-ID: 109739600, V1.1, Jan. 2019, 28 pages, Siemens AG.

\* cited by examiner

| DST MAC 502 | SRC MAC 504 | VLAN 506 | VLAN 508 | ETHER-TYPE 510 | LAYER-3 PAYLOAD 512 | TRAILER 514 | CRC/FCS 516 |

404

FIG. 5 ly rely on ed across a computer network. As
LIMITING LAYER-2 MESH FLOODING

TECHNICAL FIELD

The present disclosure relates generally to computer networks, and, more particularly, to limiting Layer-2 mesh flooding.

BACKGROUND

Increasingly, industrial and/or other processes rely on constant data communication across a computer network. As a result, these processes may fail if data communication across the computer network is lost for even a fraction of a second. Failure of these processes can result in costly production errors, equipment damage, failed processes, production line interruptions, etc. Currently, attempts to prevent these failures have involve costly and complex buildouts of failover systems such as separate physical networks to utilize in the event of these failures. These costly and complicated after-the-fact measures provide an inefficient mechanism to restart the process after the fact, but they do not address any underlying causes of the communication failure such as packet loss.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example of a modified frame for the Layer-2 mesh replication overlay;

DESCRIPTION OF EXAMPLE EMBODIMENTS

Overview

Figure 1:
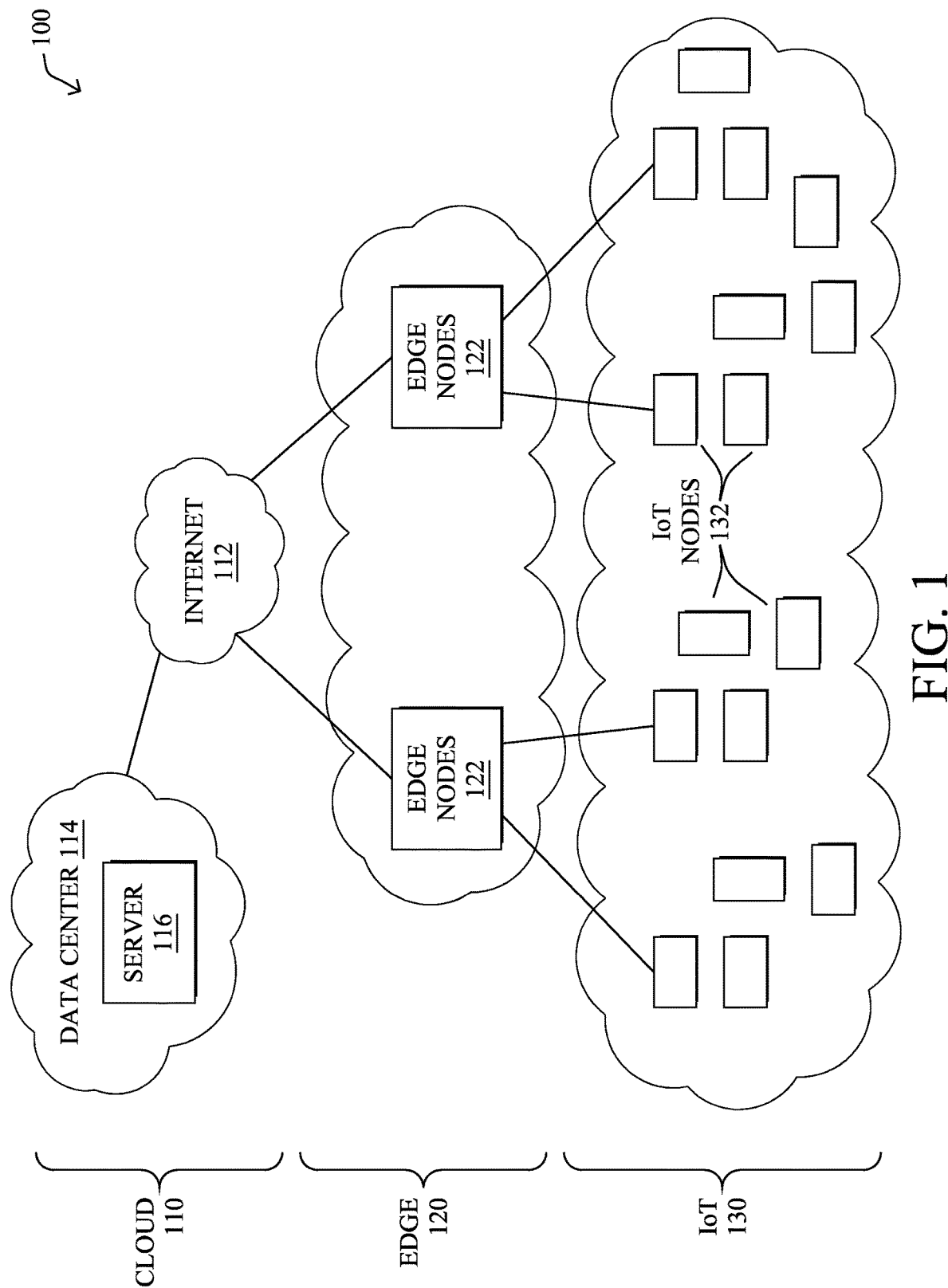
FIG. 1 illustrates an example communication network.

According to one or more embodiments of the present disclosure, an edge node of a virtual overlay for a Layer-2 mesh receives a new flow notification that indicates a destination address for a new flow in the Layer-2 mesh. The virtual overlay is configured to flood replicated frames of the new flow throughout the virtual overlay. The edge node makes a local match between the destination address indicated by the new flow notification and a local address table or group membership of the edge node. The edge node sends, based on the local match, a match notification that causes other nodes in the virtual overlay to stop flooding replicated frames of the new flow.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to edge endpoints to provide computing, storage, and networking resources and services. Multiple edge nodes organized or configured together form a edge system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge nodes/devices 122 (e.g., with edge modules, described below) may execute various edge computing resources on network edge devices, as opposed to datacenter/cloud-based servers or on the endpoint nodes 132 themselves of the IoT device layer 130. For example, edge nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
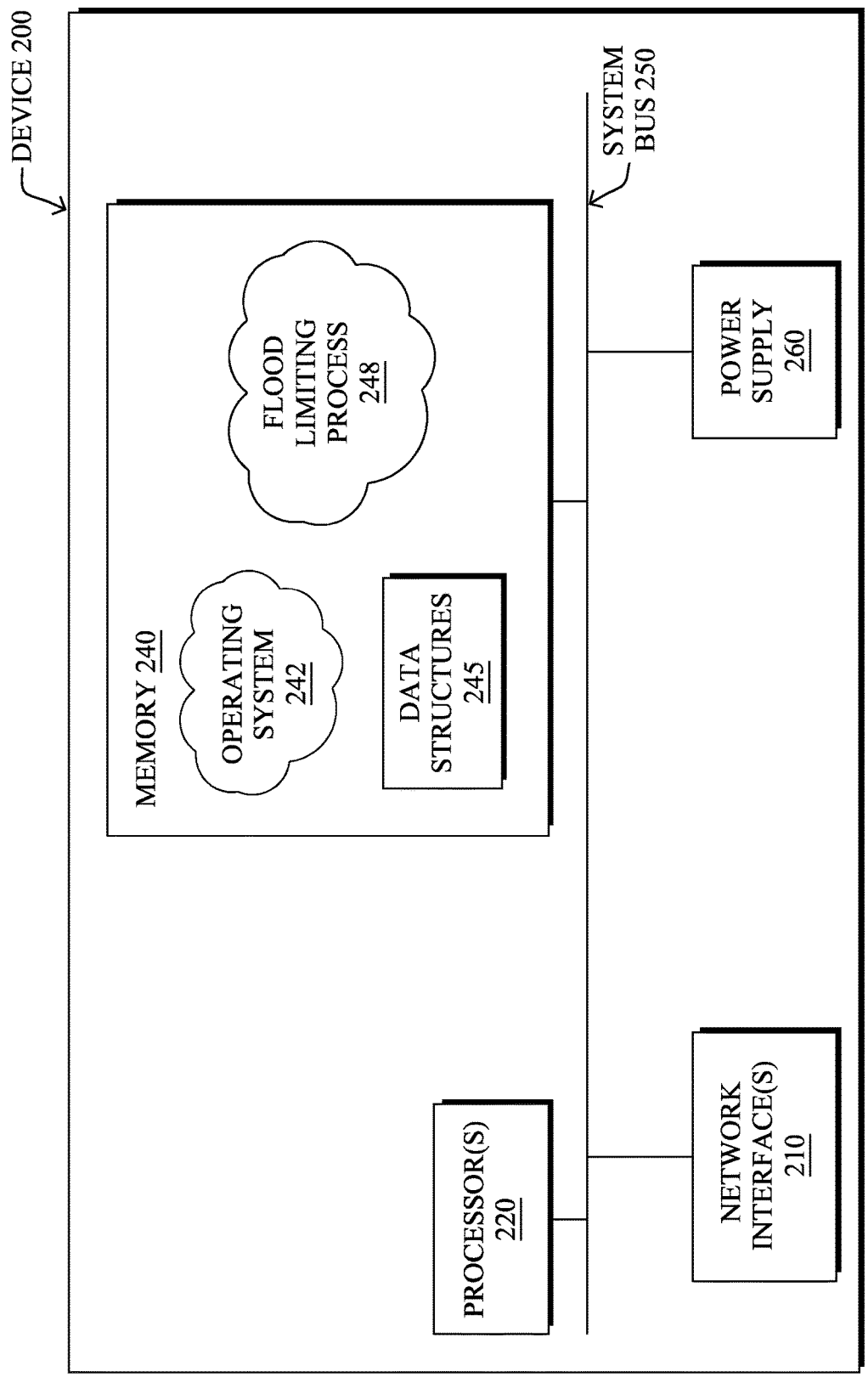
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as a switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as Ethernet, TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a flood limiting process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
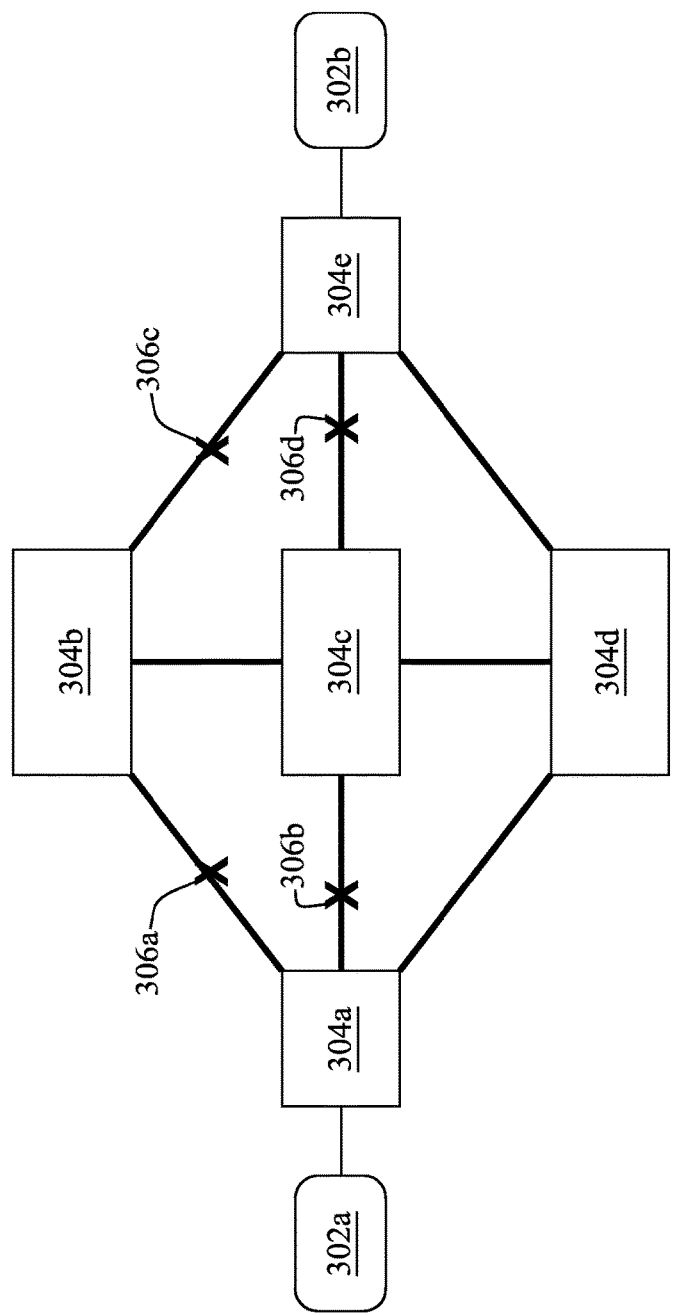
FIG. 3 illustrates an example communication network topology.

FIG. 3 illustrates an example topology of a Layer-2 mesh network 300. The Layer-2 mesh network 300 may include end devices 302. End devices 302 may include a computing device, a workstation, a laptop, a desktop computer, a printer, a multifunction printer, a server (file server, web server, etc.), a mobile phone, a tablet, a smartphone, a networking device, a sensor, an actuator, moving nodes (e.g., vehicles, mine carts, etc.), human-machine-interfaces, controllers, industrial machinery, manufacturing and/or processing line equipment, etc.

Layer-2 mesh network 300 may be utilized to communicate data between end devices 302. Data communication across computer networks, such as Layer-2 mesh network 300, between end devices, such as end devices 302, may be conceptualized as occurring over abstracted layers of the network. For example, the Open Systems Interconnection model (OSI model) may describe one such system of abstraction conceptually dividing the communication functions of a computing system into seven abstraction layers. Layer-2 of the OSI model may be a data link layer. At the data link layer of Layer-2, directly connected network nodes are used to perform node-to-node data transfer where data is packaged into frames. Layer-2 mesh network may be a topology of a computer network at Layer-2, specifically a Layer-2 mesh topology. In various embodiments, computer network may be a virtual LAN.

Layer-2 mesh network 300 may include intermediary networking devices (e.g., intermediary devices 304). Intermediary devices 304 may include node devices that forward data from one end device (e.g., end device 302a) to another end device (e.g., end device 302b) in Layer-2 mesh network 300. The intermediary devices 304 may operate as a connecting medium for end devices 302 and/or other nodes and may handle tasks in the background ensuring that the data flows effectively at desired flow rates across the entire Layer-2 mesh network 300. Intermediary devices 304 may be hubs, switches, wireless access points, and other devices used for accessing the network, file servers, web servers, print servers, modems, devices using for internetworking such as routers, bridges, repeaters, and security firewalls, etc.

In some examples, intermediary devices 304 may be Layer-2 bridges. For example, intermediary devices 304 may filter, store, forward and/or otherwise control the flow of data across Layer-2 mesh network 300. The Layer-2 mesh network 300 may be operable to communicate data according to a spanning tree protocol (STP) running on intermediary devices 304. The STP protocol may be utilized to provide redundant communication links while avoiding introducing communication loops. For example, the STP protocol may force certain data paths into a standby state (e.g., by logically blocking certain links/ports 306) leaving other data paths in a forwarding state. A particular intermediary device (e.g., intermediary device 304d) may be elected to operate as a the STP root bridge for the network. Network decisions, such as which ports to block and which ports to put in forwarding mode, may be made from the perspective of this root bridge. Therefore, the STP protocol may provide failover recovery to the Layer-2 mesh network 300 by unblocking particular ports in the event of a failure.

As noted above, today's Layer-2 mesh networks may rely on STP meshes to resolve Layer-2 broadcast storms. When a node or link fails in an STP mesh, Ethernet frames being communicated on the network may be lost while the STP topology recovers by unblocking links.

The recovery time for a rapid STP may be approximately one second. As noted above, some networks, such as networks utilized in performing industrial processes, may require constant communication to sustain industrial processes which may fail when communication is lost for a fraction of a second. For example, some industrial Ethernet solutions utilizable to coordinate real-time data exchange and industrial process application may fail even if data communication is interrupted for approximately two hundred milliseconds. These failures may cause a production line to cease.

Attempts to mitigate the shortcomings of the STP mesh by installing separate purpose-built and/or dedicated physical networks represent expensive and complex solutions that industrial networks are unlikely to adopt. Further, these attempts do not address the underlying packet loss.

In other applications, attempts at packet replication may be limited to specific topologies such as ring topologies (e.g., high-availability seamless redundancy (HSR)) and/or parallel Layer-2 networks (e.g., parallel Layer-2 networks (PRP)). Packet replication technologies for Layer-2 mesh rely on Centralized Control of the network devices comprising the Layer-2 mesh and pre-determined engineered paths through the network.

In contrast, a mechanism that provides zero packet loss over multiple Layer-2 paths is described. This may be accomplished by providing packet replication utilizing a Layer-2 mesh replication overlay without traffic engineered paths and/or without the involvement of a central controller.

Figure 4A:
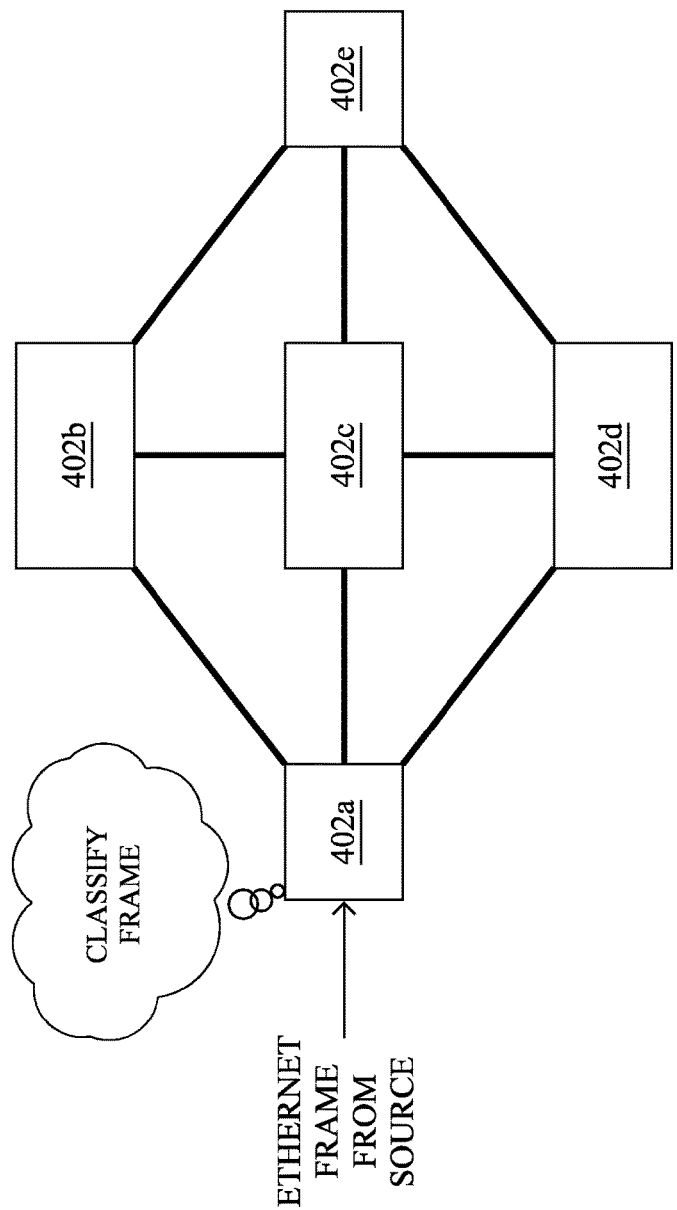
FIGS. 4A-4C illustrate an example of a Layer-2 mesh replication overlay.
Figure 4B:
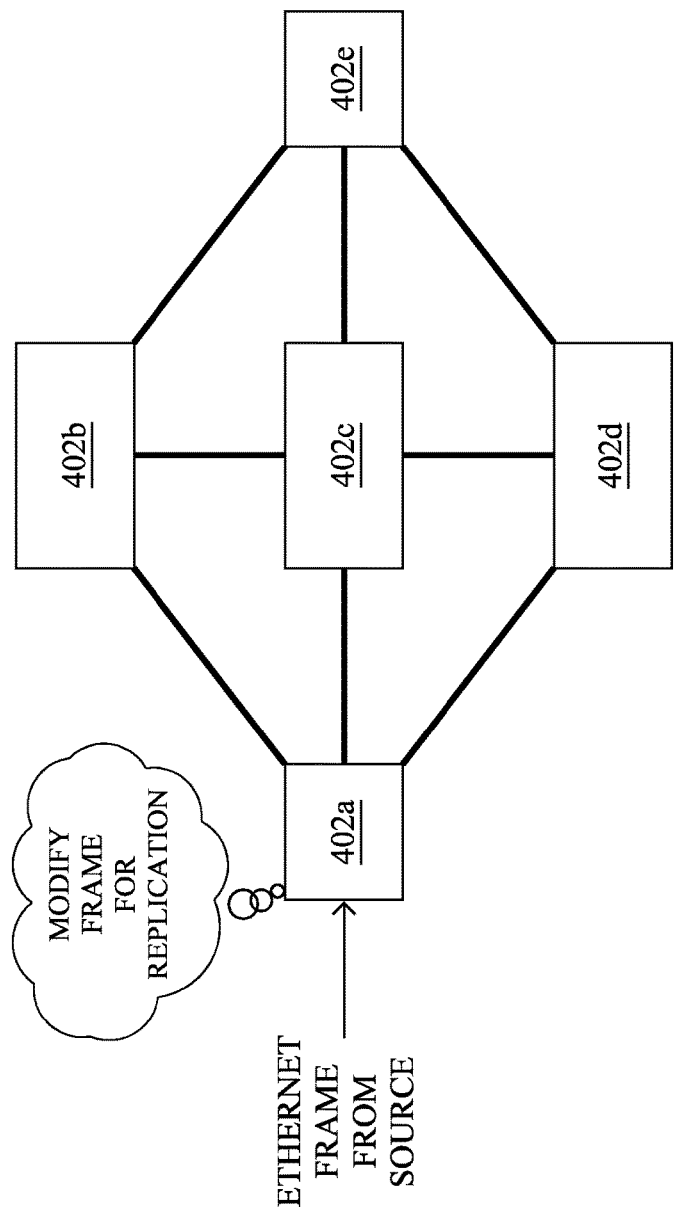
Figure 4C:
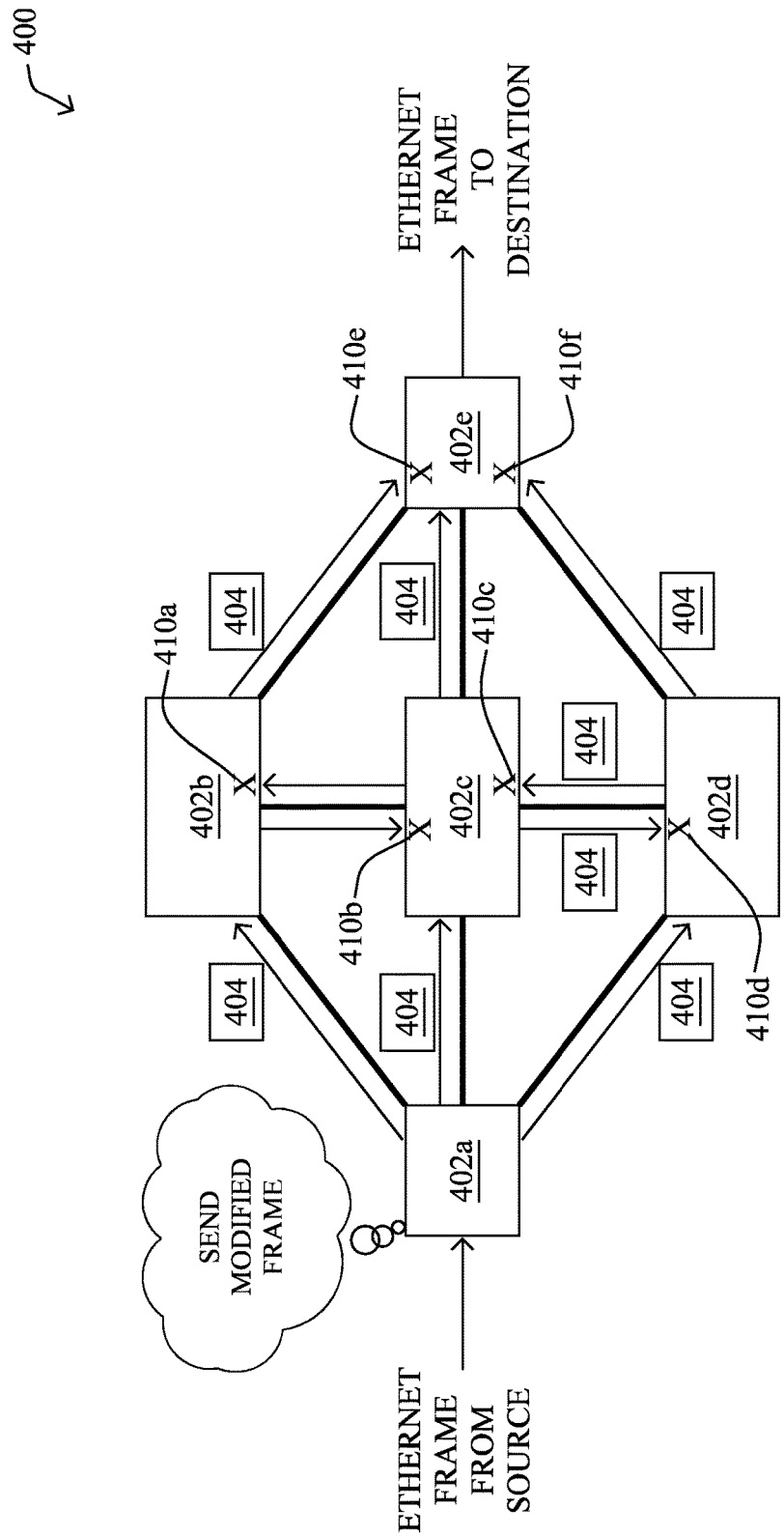
Figure 6A:
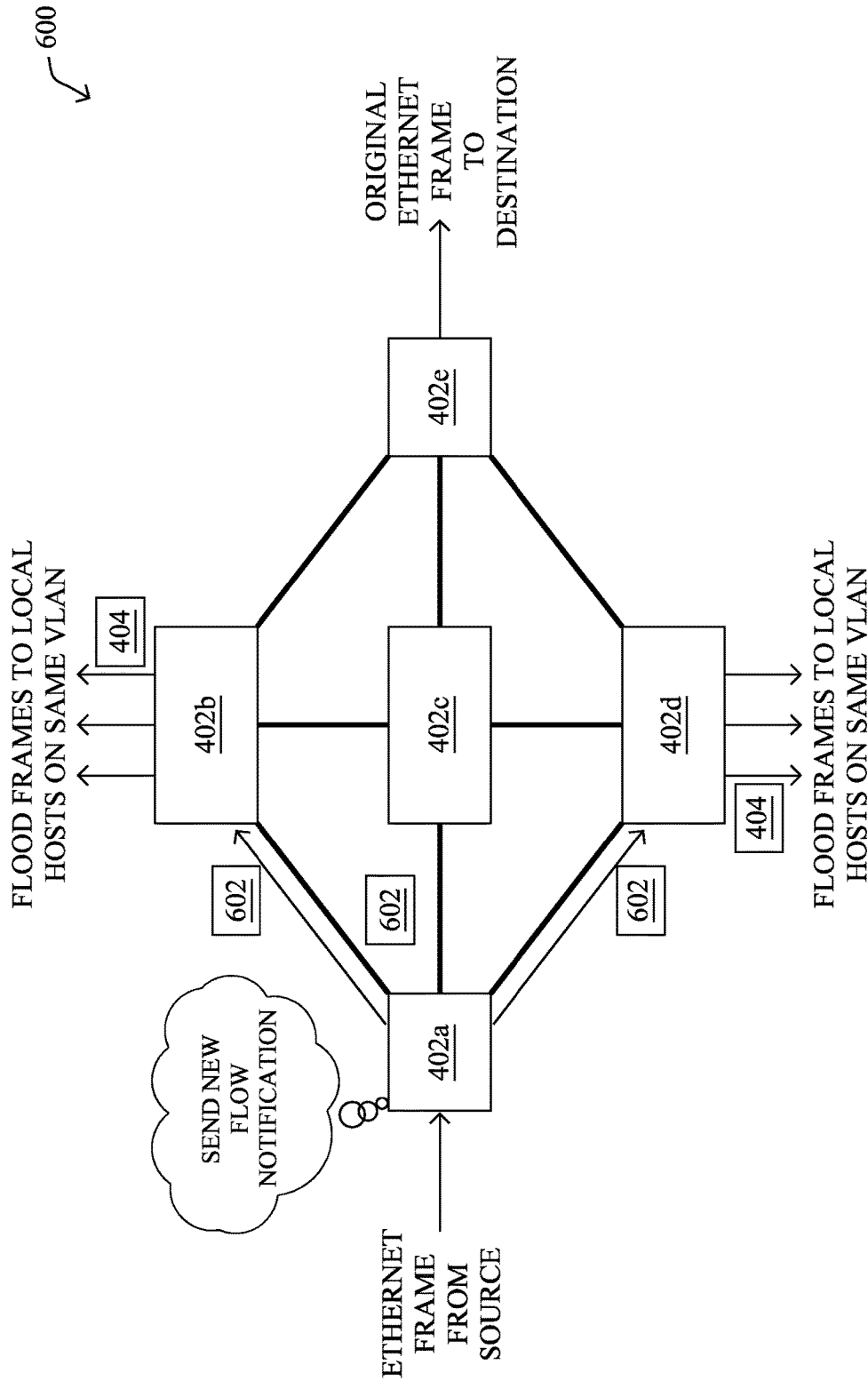
FIGS. 6A-6D illustrate an example simplified procedure for limiting flooding in a Layer-2 mesh replication overlay.
Figure 6B:
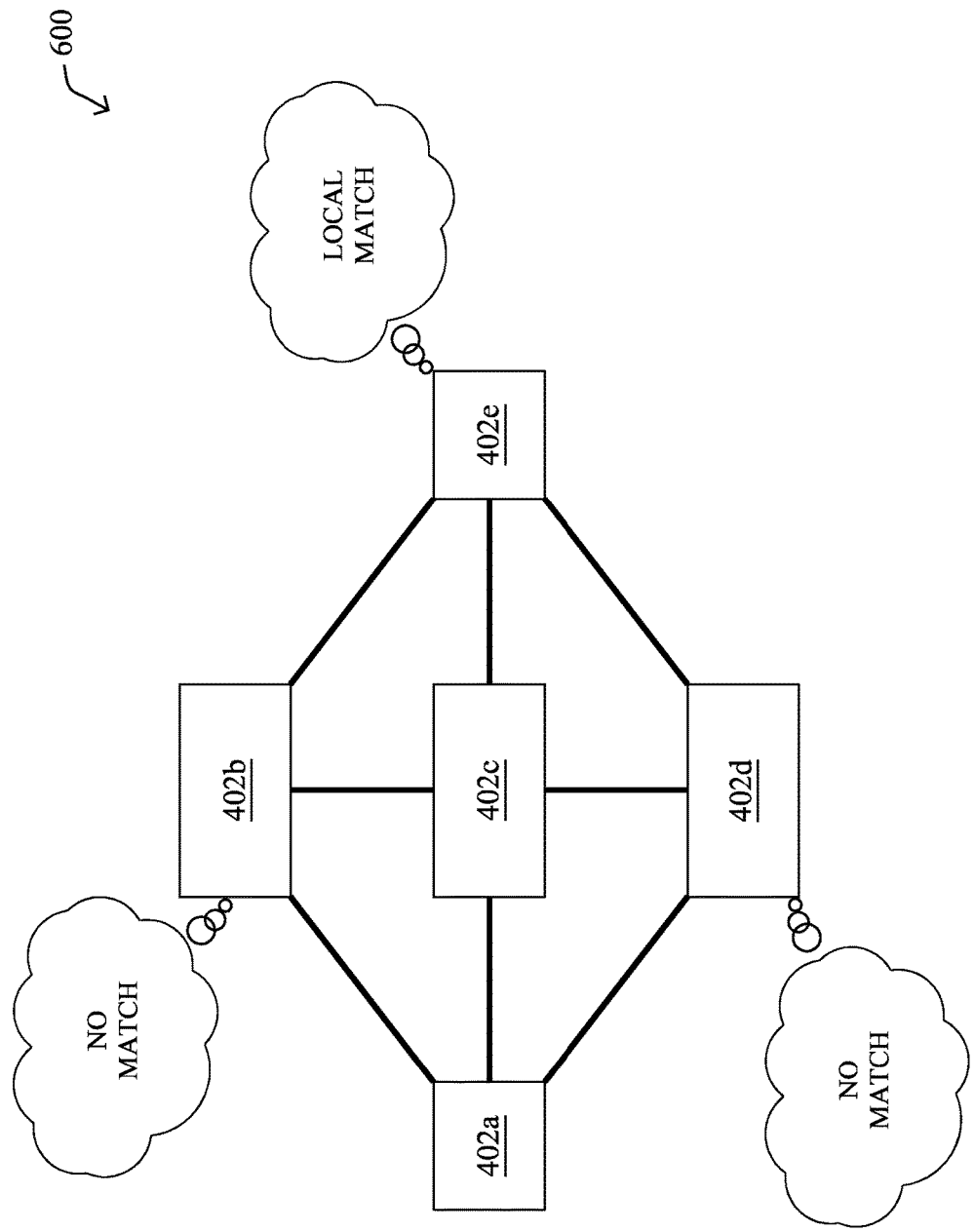
Figure 6C:
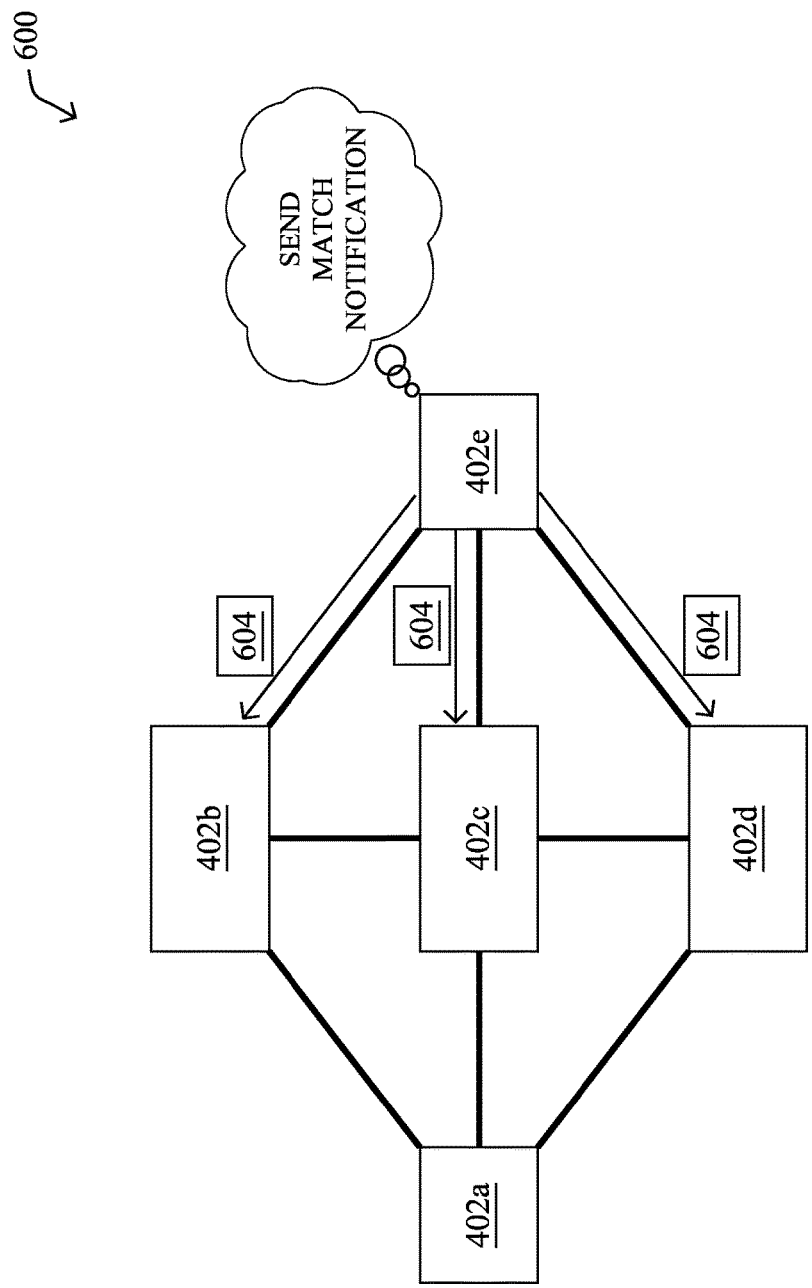
Figure 6D:
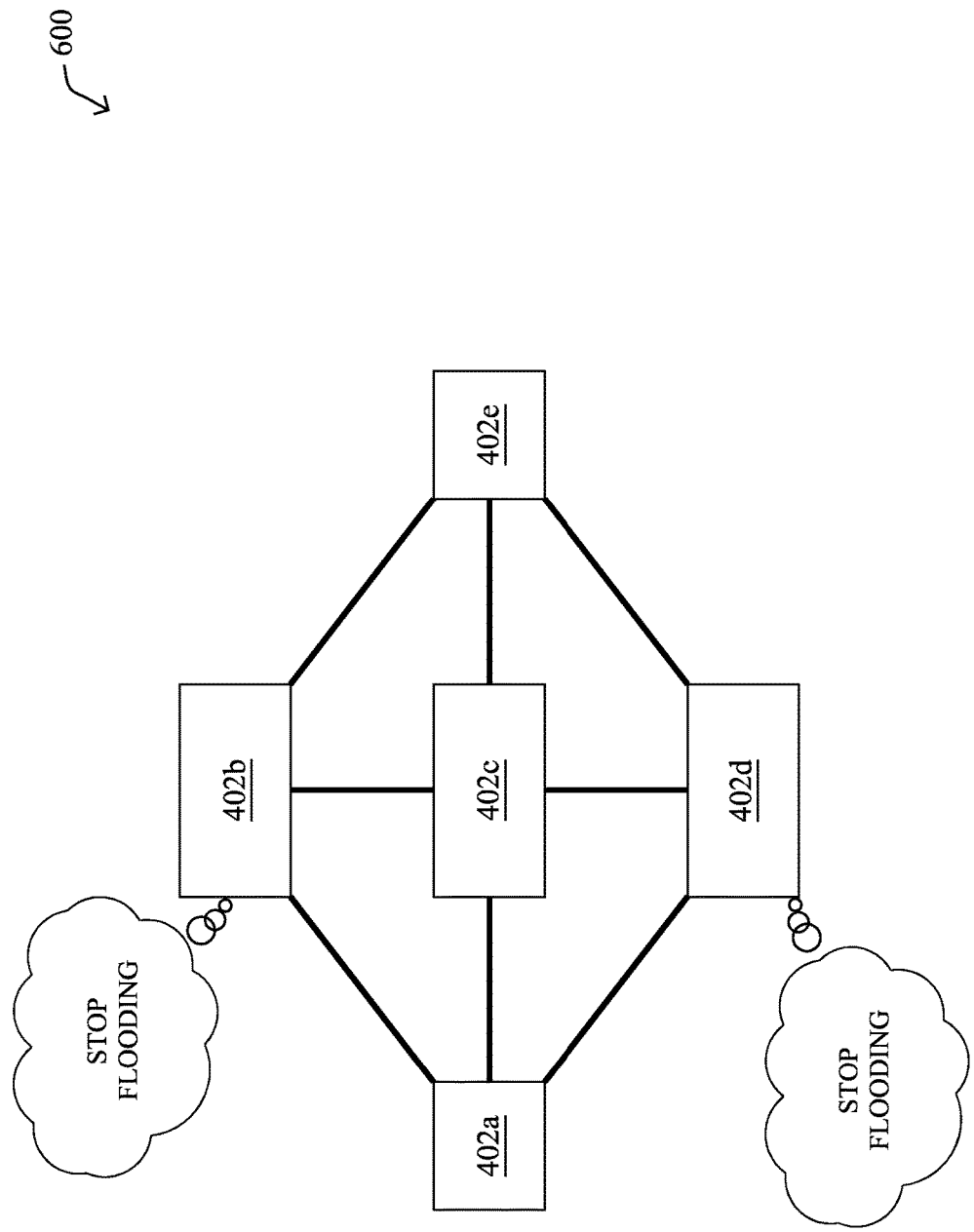

FIGS. 4A-4C illustrate a Layer-2 mesh replication overlay, according to various embodiments. For example, the Layer-2 mesh replication overlay may include a lossless redundant mesh that is a virtual overlay 400 on top of an existing infrastructure, as shown in FIG. 4A. For example, the virtual overlay 400 may include a mesh that is overlayed on top of a computer network such as Layer-2 mesh network 300 of FIG. 3. For example, the virtual overlay 400 may be a mesh overlay for which only inter-switch links are members. A spanning tree may be disabled in virtual overlay 400.

The virtual overlay 400 may be made up of nodes 402. For example, virtual overlay 400 may be a logical overlay network that groups together a subset of devices (e.g., nodes 402) that share a physical LAN isolating the traffic for the group from underlying traffic and/or VLANs (e.g., virtual overlay 400 may be overlayed on Layer-2 mesh network 300 but its traffic may be isolated from the traffic of Layer-2 mesh network 300). As such, nodes 402 may be operable as a VLAN that is distinct from its underlying VLANs and is dedicated to replication of data on inter-switch links.

All inter-switch interfaces of nodes 402 in virtual overlay 400 may be configured for forwarding data. As such, all inter-switch links of nodes 402 that are members of the replication VLAN may be configured to always forward bidirectionally and there may be no spanning tree present in the virtual overlay 400. Interfaces directly coupled to end devices may not be members of the replication VLAN of virtual overlay 400.

Nodes 402 may include one or more edge nodes (e.g., node 402a, node 402b, node 402d, node 402e) and/or one or more relay node (e.g., 402c). A relay node may operate as an intermediate forwarding node that only forwards the data to other nodes in the virtual overlay 400. Any edge node may be a source edge node (a.k.a. ingress edge node). A source edge node may be a node that ingresses data, such as an Ethernet frame, into virtual overlay 400 from a source and/or sends the data to all the other nodes in the virtual overlay 400. In addition, an edge node may be a destination edge node to egress the Ethernet frame from the virtual overlay 400 and send it on to a destination (e.g., an end device).

Virtual overlay 400 may be operable as a mesh replication mechanism that prevents data packet loss in the event of failures of nodes 402 and/or their links, ensuring Ethernet frames will be delivered from a source to a destination across a packet-replicating Layer-2 mesh network.

In various embodiments, a node (e.g., node 402a) may obtain data. The node may be an edge node which may be configured to analyze the data and determine whether to ingress the data to the virtual overlay 400 or to leave the data on the underlying network (e.g., Layer-2 mesh network 300 of FIG. 3).

The data obtained by the node may be data sent from a source device toward a destination device. The data may be arranged as a unit of data such as a frame. The frame may include the data payload along with addressing and/or protocol information for communication of the payload. For example, the payload may include the message to be delivered, the header may include the source address (e.g., source MAC address) of the frame and/or the destination address (e.g., destination MAC address) of the frame, and the trailer may include error detection and/or correction bits useful in ensuring that the frames are received intact or undamaged. In some examples, the frame may include a tag such as a VLAN tag. The VLAN tag may indicate a particular VLAN to which the packet belongs and/or is a member of. For instance, say that Layer-2 mesh network 300 of FIG. 3 is a Layer-2 VLAN mesh and that the obtained frame was one traveling on Layer-2 mesh network 300 of FIG. 3, then the frame may include a VLAN tag indicating that the frame belongs on Layer-2 mesh network 300 of FIG. 3.

An edge node (e.g., node 402a) may classify the frame. Classifying the frame may include reading and/or analyzing information from the obtained data. The read and/or analyzed information may include indications of the source of the data, the destination for the data, a type of the data, etc. The read and/or analyzed information may be compared to predetermined identifiers of data traffic classifications in order to arrive at a classification for the frame. For example, the read and/or analyzed information may be compared to an access control list (ACL) to identify a classification of the frame. The classification may be Layer-2 based (e.g., EtherType), Layer-3 based (e.g., Dest IP), Layer-4 based (Src Port Number), etc. classifications.

Packets matched against ACL entries may be classified (e.g., as critical data, as data to be replicated, etc.) for ingress to and/or communication on the replicating mesh of virtual overlay 400. Packets that failed to match against ACL entries and/or matched against ACL entries associated with a classification not destined for replication may be classified for ingress to and/or communication on the underlying Layer-2 mesh network 300 instead.

This classification scheme may be utilized to identify particular Ethernet frames to be replicated through the virtual overlay 400. For example, an ACL table may be configured such that a particular subset of Ethernet frames, such as those associated with automated industrial processes, automated utility substation control processes, etc. requiring constant data communication and/or which may fail if the frame is lost, receive a classification that causes them to be replicated across multiple paths of virtual overlay 400. In this manner, not all Ethernet frames will be deemed critical enough to be replicated. In various embodiments, a user may identify and/or configure the ACL definitions to identify which data flows are to be replicated.

The edge node (e.g., node 402a) may modify the frame for replication. For example, when an edge node classifies the frame as part of a flow to be replicated, the edge node may modify the frame in a manner that causes it to enter the virtual overlay 400 where it will be replicated and/or communicated toward its destination.

In various instances, modifying the frame may include modifying and/or adding a header to the frame. For example, the frame may be modified to include a tag associated with the virtual overlay 400. As described above, the frame may already include a VLAN tag (e.g., an original VLAN tag such as original VLAN tag 508 of FIG. 5) associated with an underlying VLAN. In such instances, the frame may be modified to include an additional VLAN tag (such as replication VLAN tag 506 of FIG. 5) which identifies the virtual overlay 400 as the new or additional VLAN upon which it should be traveling. This additional VLAN tag may be added to the frame in addition to its original VLAN tag. This additional VLAN tag may permit and/or cause the frame to be ingressed to and/or communicated across virtual overlay 400.

In some instances, modifying the frame may include modifying and/or adding a trailer to the frame. The trailer of the modified frame may be utilized to uniquely identify a flow, its source, and a sequence of its constituent frames within the virtual overlay 400.

For example, the frame may be modified to include a trailer (such as trailer 514 of FIG. 5) providing identifying information for uniquely identifying the frame and/or its associated flow. For instance, the frame may be modified to include a trailer including a flow identifier for the frame. The flow identifier may identify the data flow with which the frame is associated. The flow identifier may be a unique flow identifier created by the ingressing edge node (e.g., node 402a) for each new flow for a source node.

The trailer of the modified frame may also include a source identifier. The source identifier may identify the source of the frame. Each frame obtained from the same source may be expected to have a common source identifier.

Additionally, the trailer of the modified frame may include a sequence number of the frame. The sequence number may identify the intended sequence of the frame within the data flow. For example, the edge node may set a sequence identifier of a first frame in a flow to "1" and for each subsequent frame in that flow may, the edge node may increment the flow sequence number while leaving the flow identifier and source identifier the same.

As illustrated in FIG. 4C, the edge node (e.g., node 402a) may send the modified frame 404 into and/or across the virtual overlay 400 toward a destination. For example, the edge node may flood the modified frame 404 into the virtual overlay 400. That is, once ingressed into virtual overlay 400, the modified frame 404 may be replicated along different paths in the virtual overlay 400. The entire virtual overlay 400 may be flooded with copies of the modified frame 404.

For example, after modifying the frame by imposing the flow identifier, source identifier, and/or sequence number values into the trailer of the frame and/or the VLAN tag into the header of the frame, the edge node (e.g., node 402a) may operate as an ingress node by forwarding the modified frame to all the nodes to which it is directly connected (e.g., node 402b, node 402c, and node 402d). Each of the nodes receiving a copy of this modified frame 404 (e.g., node 402b, node 402c, and node 402d) may then forward a copy of the modified frame 404 to all of the nodes to which it is directly connected. For example, where node 402a was the ingress node, node 402b may forward a copy of the modified frame 404 to node 402c and node 402e, node 402c may forward a copy of the modified frame 404 to node 402b, node 402d, and node 402e, and node 402d may forward a copy of the modified frame 404 to node 402c and node 402e.

In various embodiments, replicating the modified frame 404 through the virtual overlay 400 may result in duplicate copies of the modified frame 404 arriving at various nodes of the virtual overlay 400. For example, where node 402a is an ingress node, node 402*b* may receive duplicate copies of the modified frame 404 from node 402*a* and node 402*c*, node 402*c* may receive duplicate copies from node 402*a*, node 402*b*, and node 402*d*, node 402*d* may receive duplicate copies from node 402*a* and node 402*c*, and node 402*e* may receive duplicate copies from node 402*b*, node 402*c*, and node 402*d*.

However, the virtual overlay 400 may be configured to perform deduplication with respect to duplicate copies of the modified frame 404, as shown in FIG. 4C. For example, each node 402 of virtual overlay 400 may be configured to discard duplicate frames of a stream of data. For instance, each node 402 may utilize the trailer in the copies of the modified frame 404 to identify duplicate frames to be dropped and/or otherwise discarded. As previously described, the modified frames 404 may include a flow identifier, a source node identifier, and/or a sequence number placed in the trailer after a Layer-3 payload in the frame. As such, these trailers may be utilized at each node 402 to identify any duplicate copies of the modified frame 404 that it has received. For example, copies of modified Ethernet frames received at a particular node that have corresponding data (e.g., matching flow identifiers, matching source node identifiers, matching sequence numbers, etc.) in their trailers may be identified as duplicates. Each node 402 may be configured to drop 410 copies of the modified frame 404 that are identified, based on the data flow identifier, source node identifier, and/or sequence number in their trailer, as being duplicates of packets already received by that node.

A destination edge node (e.g., node 402*e*) may receive its unique copy of the modified frame 404 and may forward it to its destination. As previously described, the destination of the modified frame 404 may include an end device coupled to the destination edge node. All other duplicate copies of the modified frame 404 may be dropped by the destination edge node (e.g., at drop 410*e* and drop 410*f*).

The destination edge node may know it is the destination edge node based on a destination MAC address in the modified frame. The destination edge node may recognize the destination MAC address from its local table and program hardware to move frame from the virtual overlay 400 back to its original VLAN (e.g., Layer-2 mesh network 300 of FIG. 3). Moving the modified frame 404 back to its original VLAN may include removing the additional VLAN tag indicating membership to the virtual overlay 400 from the frame.

The destination edge node may send a message to all other nodes in the virtual overlay 400 informing them that it has successfully programmed the hardware to remove the frame back to its original VLAN. This message may serve as an indication to the other nodes that they no longer need to flood the virtual overlay 400 with copies of the frame. As a result, the other nodes may discontinue replicating and forwarding the modified frame within the virtual overlay 400. Otherwise, the other nodes may continue to flood the modified frame until the destination node programming succeeds.

In various embodiments, the frames ingressed into the virtual overlay 400 may be broadcast frames and/or multicast frames (e.g., identified by the destination MAC address). These frames may be replicated to all the edge nodes of virtual overlay 400 and each edge node may forward the frames as it would any other broadcast or multicast frame on the original VLAN following stripping of the additional VLAN tag associated with virtual overlay 400.

FIG. 5 illustrates an example of a modified frame 404 for Layer-2 mesh replication in a virtual overlay. As detailed above, an edge node may modify an Ethernet frame based on its classification (e.g., "modify frame for replication" 406 in FIG. 4B) in order to ingress the frame into a virtual overlay network to be communicated as a replication flow.

Prior to modification, a frame header may include a Layer-3 payload destined for a destination MAC address. The payload may be encapsulated by a header. The header may include a destination MAC address 502, a source MAC address 504, an original VLAN tag 508, and/or an Ethertype designation 510 of the frame. Additionally, the payload may be encapsulated by a frame check sequence (FCS)/cyclic redundancy check (CRC).

The edge node may, upon classifying the frame for inclusion in a replication flow, modify this frame to include additional fields. For example, the frame may be modified so that the modified frame 404 includes a replication VLAN tag 506 to grant the modified frame 404 membership into a Layer-2 replication mesh that is virtually overlayed on an underlying non-replicating Layer-2 VLAN.

In various embodiments, replication VLAN tag 506 may be a VLAN tag added in addition to the original VLAN tag 508. For example, replication VLAN tag 506 may be an additional or outer VLAN tag representing VLAN membership for the modified frame 404 within the virtual overlay, while the original VLAN tag 508 is retained as an inner VLAN tag within the modified frame 404 to preserve the indication that the frame may also be a member of the VLAN underlying the virtual overlay. Replication VLAN tag 506 may be added to the frame to provide ingress into and replicative communication through the virtual overlay. The modified frame 404 with the replication VLAN tag 506 and the original VLAN tag 508 may be intercommunicated between the Layer-2 virtual overlay and the underlying Layer-2 VLAN based on the IEEE 802.1Q-in IEEE 802.1Q (QinQ) protocol. Replication VLAN tag 506 may be removed from a copy of the modified frame 404 upon egress from the virtual overlay back to the underlying Layer-2 VLAN for communication toward the destination (e.g., the end device).

Additionally, the edge node may modify, based on the classification of the frame, the frame to include trailer 514 after its Layer-3 payload 512. Trailer 514 may be used by nodes in the virtual overlay to identify the frame and/or its flow for the purposes of deduplication.

For example, Trailer 514 may contain a source node identifier for the source of modified frame 404. The source node identifier may be approximately 1 Byte. Trailer 514 may contain a flow identifier of modified frame 404. The flow identifier may be approximately 1 Byte. Trailer 514 may include a flow sequence identifier for modified frame 404. The flow sequence identifier may be approximately 2 Bytes.

Modified frame 404 may be communicated as a replication flow at a Layer-2 level in the virtual overlay. Specifically, modified frame 404 may be flooded into the virtual overlay along multiple paths. That is, each node of the virtual overlay may send copies of modified frame 404 to each of its immediately connected neighboring nodes in the virtual overlay. Consequently, each node may end up receiving multiple copies of modified frame 404. To address the duplicate frames, trailer 514 may be utilized within the Layer-2 mesh to uniquely identify the flow and to perform deduplication with respect to two or more copies of the modified frame 404 within the Layer-2 mesh.

As noted above, the trailer may be utilized to deduplicate instances of the modified frame 404 flooding the virtual overlay. However, the flooding of the modified frame 404 may persist in the virtual overlay beyond productive bounds. For example, the flooding may persist and perpetuate by non-destination nodes to additional non-destination hosts on the same VLAN past when a targeted destination node has been identified, received the modified frame 404, and/or forwarded modified frame 404 out of the virtual overlay and/or on to its destination end device. This may represent a waste of power, bandwidth, computational capacity, etc. of the virtual overlay and lead to increased latency. Further, without implementing Layer-2 learning, frames such as Ethernet frames directed to one or more end devices may not be delivered to those devices without flooding that frame to all end devices in the same original ingress VLAN.

Limiting Layer-2 Mesh Flooding

The techniques described herein introduce mechanisms for dynamic messaging between disparate nodes in a Layer-2 mesh. These techniques may be utilized to limit the flooding of frames in the Layer-2 mesh without involvement of a complex central controller managing flows through the Layer-2 mesh.

Specifically, according to one or more embodiments of the disclosure as described in detail below, an edge node of a virtual overlay for a Layer-2 mesh receives a new flow notification that indicates a destination address for a new flow in the Layer-2 mesh. The virtual overlay is configured to flood replicated frames of the new flow throughout the virtual overlay. The edge node makes a local match between the destination address indicated by the new flow notification and a local address table or group membership of the edge node. The edge node sends, based on the local match, a match notification that causes other nodes in the virtual overlay to stop flooding replicated frames of the new flow.

Illustratively, the techniques described herein may be performed by hardware, software, and/or firmware, such as in accordance with the flood limiting process 248, which may include computer executable instructions executed by the processor 220 (or independent processor of interfaces 210) to perform functions relating to the techniques described herein.

Operationally, and according to various embodiments, a mechanism is described that limits flooding within a Layer-2 replication overlay.

FIGS. 6A-6D illustrate an example simplified procedure for limiting flooding in a Layer-2 mesh replication overlay in accordance with one or more embodiments described herein. Layer-2 mesh 600 may include a plurality of nodes (e.g., node 402a, node 402b, node 402c, node 402d, node 402e) that may include networking equipment (e.g., Ethernet switches) utilizable in a frame replicating virtual overlay (e.g., not operated utilizing an STP protocol) and/or in an underlying VLAN network (e.g., Layer-2 mesh network operated according to an STP protocol).

The virtual overlay may be a Layer-2 mesh for replication (e.g., a different VLAN for replication on inter-switch links) that is an overlay on top of the physical infrastructure. In various embodiments, the virtual overlay may be operable in the same manner as virtual overlay 400 in FIGS. 4A-4C as a virtual overlay of Layer-2 mesh network 300 of FIG. 3. A modified frame may be flooded into and across the virtual overlay with all inter-switch interfaces forwarding copies of the modified frame.

In various embodiments, an edge node (e.g., node 402a) of the virtual overlay may receive a frame. The frame may be a unicast or multicast traffic type Ethernet frame that is associated with a unique flow sent from a source end device to a specific destination end device (e.g., unicast) and/or a specific group of destination end devices (e.g., multicast). The source end device may be associated with a specific source network address and each destination end device may be associated with a specific destination network address and/or multicast group address.

In some instances, the flow may be a new flow. A new flow may include a flow that represents a new flow of data entering the virtual overlay for the first time. While the data of the new flow may be similar or identical to the data of previous flows sent through the virtual overlay (e.g., a same command issued periodically to a piece of industrial machinery to perform a repetitive task), however the unique new flow may be a new instance and/or communication of the data through the virtual overlay. Unique new flows may be created various ways. For example, a new unique flow may be hard coded by a user. The end user may explicitly identify a source node and a destination node configuring both ends. Alternatively, new unique flow may be created dynamically. The edge node receiving the new unique flow may serve as a source edge node (a.k.a. an ingress edge node) that is the ingress point for ingress of the new unique flow into the virtual overlay.

The source edge node that received the frame associated with the new flow may detect the new flow. Since the source edge node acts as the ingress node for the virtual overlay it may utilize identifying information included in the frame to determine that the frame is associated with a new flow and/or should be ingressed into the virtual overlay. In some instances, the source edge node may detect the new flow based on a source identifier packaged in the received frame of the flow, a destination identifier packaged in the received frame of the flow, a MAC address packaged in the received frame of the flow, ACL classification of the received frame of the flow, etc.

The source edge node may then assign a new flow identifier and/or otherwise modify the frame and forward (e.g., ingress) the modified frame 404 into the replication VLAN of the virtual overlay. In some instances, the hardware of the source edge node that received the frame may detect the new flow, assign the new flow identifier, and/or forward the modified frame 404 into the virtual overlay, rather than waiting for its software to do so. In such instances the hardware of the source edge node may inform the software of the new flow thereafter.

As described in detail above, forwarding modified frame 404 into and/or through virtual overlay may include flooding modified frame 404 into the virtual overlay. For example, the source edge node that received the frame may ingress it into virtual overlay and begin to flood copies of modified frame 404 to its interconnected neighboring nodes (e.g., flood copies to node 402b, node 402c, and node 402d). These neighboring nodes may be configured to perpetuate the flooding of modified frame 404 within the virtual overlay. For example, the edge nodes (e.g., node 402b and 402d) that received copies of the modified frame 404 from the source edge node may be configured to flood copies of the modified frame 404 to local hosts on the same VLAN and/or other connected edge nodes.

The source edge node may notify the other nodes participating in the virtual overlay (e.g., node 402b, node 402c, node 402d, node 402e) of the new flow. For example, the source edge node may send a new flow notification 602 to and/or through the other nodes (e.g., node 402b, node 402c, node 402d, node 402e). For instance, the source edge node may send new flow notification 602 to its directly connected edge nodes (e.g., node 402b and node 402d) and/or to its directly connected relay nodes (e.g., node 402c) for forwarding to their connected edge nodes (e.g., node 402e). The communication of the new flow notification 602 among all the Layer-2 mesh nodes (e.g., node 402a, node 402b, node 402c, node 402d, node 402e) may be done in the underlay (e.g., like a Layer-2 mesh network 300 of FIG. 3) underneath the virtual overlay where, unlike the virtual overlay, a spanning tree still controls forwarding paths. However, transmitting communication frames via the underlay is a non-limiting example and additional embodiments are contemplated where communication frames are additionally or alternatively sent via the virtual overlay.

New flow notification 602 may notify the other edge nodes (e.g., node 402b, node 402d, and node 402e) of the new flow and provide them with information about the flow. For example, new flow notification 602 may include identifying details of the new flow such as a source node identifier, a unique flow identifier, a destination address, an original VLAN of a frame, etc. associated with the new flow. The destination address may include the network address of the destination to which the flow is directed. In various examples, the destination address may include a destination MAC address indicating the network address of the frames intended destination and/or an address of a multicast group when the frame is a multicast frame.

Each of the other edge nodes receiving new flow notification may be associated with a local address table. The table for each edge node may indicate the network addresses of nodes and/or end devices for which the edge node serves as a destination node and/or is directly connected to or in communication with. In examples involving unicast frame communication, the relevant local address table may be a MAC address table. In examples involving multicast frame communication, the relevant local address table may include an internet group management protocol (IGMP) membership table.

In various embodiments, only a portion of the edge nodes receiving new flow notification 602 may be destination edge nodes to and/or through which the flow is directed. The portion of the nodes that are destination nodes for a particular flow may be identifiable as such based on having a destination MAC address matching the destination MAC address for the flow, as specified in the new flow notification 602, on a non-mesh link interface. As described above, for unicast frames the match may be a match to an address MAC address table. However, for multicast frames the match may be a match to a group address in a local multicast membership address table.

For example, with respect to a unicast frame, only one node is the destination node (e.g., node 402e) that has, in its local address table, a match to the destination address indicated by new flow notification 602. Continual flooding to and/or by the non-destination edge nodes (e.g., node 402b and node 402d) to local hosts on their same VLAN may represent a waste of power, bandwidth, and/or computational resources since they are not associated with the destination of the flow and their activity will ultimately not result in forwarding of the frames of the flow to their destination end device. The same logic applies to multicast frames where only one node has, in its local address table, a match to the destination group address indicated by the new flow notification 602.

Upon receiving new flow notification 602, each of the other nodes of Layer-2 mesh 600 (e.g., node 402b, node 402c, node 402d, node 402e) may compare the destination address indicated by new flow notification 602 to their local MAC address table or, in the cast of multicast frames, their local multicast membership table. By doing this, each of the other nodes of Layer-2 mesh 600 (e.g., node 402b, node 402c, node 402d, node 402e) may determine whether it is the destination node. The destination node may be the node with a MAC address in its local MAC address table and/or with a multicast group address in its local multicast membership table that matches the destination address indicated by new flow notification 602. For example, non-destination edge nodes (e.g., node 402b and node 402d) may determine that there is no match between the destination address indicated by new flow notification 602 and any addresses in their respective local address tables. Conversely, a destination node (e.g., node 402e) may determine that there is a local match between the destination address indicated by new flow notification 602 and an address in its local address tables and/or that it is the destination node for the flow.

The destination edge node may send a match notification 604 to the other nodes. Match notification 604 may be sent based on finding the local match to the destination node. For example, a destination edge node (e.g., node 402e) may send match notification 604 to the non-destination edge nodes (e.g., e.g., node 402a, node 402b, and/or node 402d) and/or relay nodes (e.g., node 402c) of the Layer-2 mesh 600. Match notification 604 may inform the other nodes that the destination edge node has been found, of the identity of the destination edge node, and/or that they are not the destination edge node.

Match notification 604 may, in some instances, be sent to the other nodes responsive to successfully configuring the hardware of the destination edge node. For example, match notification 604 may be sent responsive to configuring the hardware of the destination node to remove an outer VLAN tag from frames of the flow, remove the frames of the flow from the virtual overlay, move the frames of the flow to their original VLAN underlay, and/or to forward the frames of the flow to the destination end device and/or group of end devices. As such, match notification 604 may be an indication of a successful configuration of hardware at a destination node.

In addition, match notification 604 may serve as a stop flooding command to the other nodes. For example, match notification 604 may cause the non-destination edge nodes (e.g., node 402a, node 402b, and/or node 402d) and/or relay nodes (e.g., node 402c) of the Layer-2 mesh 600 to stop flooding replicated frames of the new flow into the virtual overlay, across the virtual overlay, and/or to local hosts on the same VLAN. A unicast and/or multicast traffic flow may require a destination edge node to acknowledge programming of the destination node hardware to all other non-destination nodes. Otherwise, the unicast and/or multicast traffic may continue to be flooded until the destination node sends match notification 604, just as it would for any unknown unicast and/or multicast packet.

Responsive to receiving match notification 604, the non-destination nodes may stop flooding replicated frames of the new flow. For example, non-destination edge nodes (node 402b and node 402b) may discontinue flooding copies of the modified frame 404 associated with a particular flow to local hosts on the same VLAN once they have received the match notification 604 associated with that particular flow.

The destination node, however, may continue to play a role in delivering frames of the flow to their destination end device. For example, the destination node may, upon receiving frames of the flow, remove an outer VLAN tag from frames of the flow, remove the frames of the flow from the virtual overlay, move the frames of the flow to their original VLAN underlay, and/or forward the frames of the flow on to their destination address. As described above, the frames may be deduplicated by the destination node. In such instances, the edge node may be forwarding a copy of the modified frame 404 that survived (e.g., was not discarded as duplicative) the deduplication process to its specified destination address.

Figure 7:
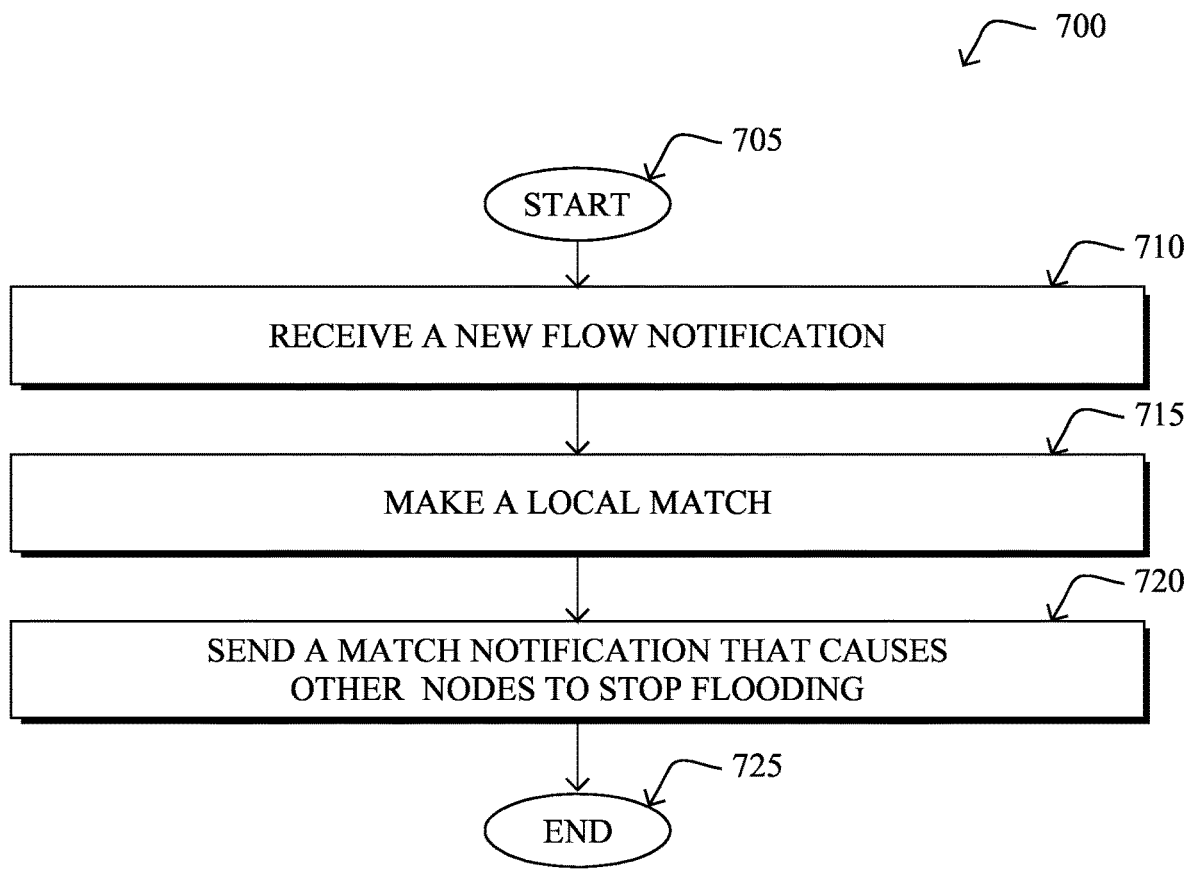
FIG. 7 illustrates simplified procedure for limiting flooding in a Layer-2 mesh replication overlay.

FIG. 7 illustrates an example simplified procedure for limiting flooding in a Layer-2 mesh replication overlay in accordance with one or more embodiments described herein. For example, a non-generic, specifically configured device (e.g., device 200) may perform procedure 700 by executing stored instructions (e.g., flood limiting process 248).

The procedure 700 may start at step 705, and continues to step 710, where, as described in greater detail above, a new flow notification may be received at an edge node of a virtual overlay for a Layer-2 mesh. The new flow notification may indicate a destination address for a new flow in the Layer-2 mesh. The edge node may receive the new flow notification from another edge node of the Layer-2 mesh via a forwarding path. In various embodiments, the forwarding path may be a forwarding path utilizing an underlay and/or an overlay of the Layer-2 mesh.

The virtual overlay may be configured to flood replicated frames of the new flow throughout the virtual overlay. In some instances, the virtual overlay may be a virtual local area network. The edge node may comprise an Ethernet switch.

At step 715, as detailed above, the edge node may make a local match between the destination address indicated by the new flow notification and a local address table or group membership of the edge node. The destination address may be a MAC address.

At step 720, as detailed above, a match notification may be sent by the edge node and based on the local match. The match notification may be sent utilizing the virtual overlay and/or the underlay of the Layer-2 mesh. The match notification may cause other nodes in the virtual overlay to stop flooding replicated frames of the new flow. The replicated frames may include a header that includes a virtual local area network tag inserted by an ingress node of the virtual overlay. In various embodiments, the replicated frames may include a trailer, including a sequence number of the replicated frame, an identifier for the source of the replicated frame, and a flow identifier associated with the replicated frame, inserted by an ingress node of the virtual overlay. The edge node may perform deduplication with respect to two or more copies of the frame based on the trailer. The edge node may receive the two or more copies of the replicated frame via the virtual overlay. The edge node may forward a copy of the replicated frame that survived the deduplication to a destination address.

Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a mechanism to limit flooding in a Layer-2 mesh. These techniques may be implemented in replication mesh virtual overlay. The techniques may conserve power, bandwidth, computational capacity, etc. by stopping non-productive flooding of unicast traffic and/or multicast traffic at non-destination edge nodes of the virtual overlay. As such, a virtual overlay that performs packet replication to prevent packet loss without implementing traffic engineered paths or central controls may be instantiated without wasting network resources by flooding unicast traffic and/or multicast traffic to non-destination edge nodes of the virtual overlay.

While there have been shown and described illustrative embodiments limit flooding in a Layer-2 mesh, it is to be understood that various other adaptations and modifications may be made within the spirit and scope of the embodiments herein. For example, while certain embodiments are described herein that involve stopping flooding by non-destination edge nodes responsive to receiving a match notification at those nodes from a destination edge node, in other embodiments the non-destination edge nodes may stop flooding responsive to determining at those nodes that there is no match between the destination address indicated by the new flow notification and any addresses in their respective local address tables/group memberships.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at an edge node of a virtual overlay for a Layer-2 mesh, a new flow notification that indicates a destination address for a new flow in the Layer-2 mesh, wherein the virtual overlay is configured to flood replicated frames of the new flow throughout the virtual overlay;
   making, by the edge node, a local match between the destination address indicated by the new flow notification and a local address table or group membership of the edge node; and
   sending, by the edge node and based on the local match, a match notification that causes other nodes in the virtual overlay to stop flooding replicated frames of the new flow.

2. The method of claim 1, wherein the virtual overlay is a virtual local area network.

3. The method of claim 2, wherein each of the replicated frames include a header that comprises a virtual local area network tag inserted by an ingress node of the virtual overlay.

4. The method of claim 1, wherein each of the replicated frames include a trailer, comprising a sequence number, an identifier of a source, and a flow identifier, inserted by an ingress node of the virtual overlay.

5. The method of claim 4, wherein the edge node performs deduplication with respect to two or more copies of each of the replicated frames based on the trailer.

6. The method of claim 5, wherein the edge node forwards a copy of a replicated frame that survived the deduplication to a destination address.

7. The method of claim 5, wherein the edge node receives the two or more copies of each of the replicated frames via the virtual overlay.

8. The method of claim 1, wherein the edge node receives the new flow notification from another edge node of the Layer-2 mesh via a forwarding path of the Layer-2 mesh.

9. The method of claim 1, wherein the destination address is a MAC address.

10. The method of claim 1, wherein the edge node comprises an Ethernet switch.

11. An apparatus, comprising:
one or more interfaces to communicate with a Layer-2 mesh;
a processor coupled to the one or more interfaces and configured to execute one or more processes; and
a memory configured to store a process that is executable by the processor, the process when executed configured to:
receive, at an edge node of a virtual overlay for the Layer-2 mesh, a new flow notification that indicates a destination address for a new flow in a Layer-2 mesh, wherein the apparatus is an edge node of a virtual overlay for the Layer-2 mesh, wherein the virtual overlay is configured to flood replicated frames of the new flow throughout the virtual overlay;
make a local match between the destination address indicated by the new flow notification and a local address table or group membership of the apparatus; and
send, based on the local match, a match notification that causes other nodes in the virtual overlay to stop flooding replicated frames of the new flow.

12. The apparatus of claim 11, wherein the virtual overlay is a virtual local area network.

13. The apparatus of claim 12, wherein each of the replicated frames include a header that comprises a virtual local area network tag inserted by an ingress node of the virtual overlay.

14. The apparatus of claim 11, wherein each of the replicated frames include a trailer, comprising a sequence number, an identifier of a source, and a flow identifier, inserted by an ingress node of the virtual overlay.

15. The apparatus of claim 14, wherein the apparatus performs deduplication with respect to two or more copies of each of the replicated frames based on the trailer.

16. The apparatus of claim 15, wherein the apparatus forwards a copy of a replicated frame that survived the deduplication to a destination address.

17. The apparatus of claim 15, wherein the apparatus receives the two or more copies of each of the replicated frames via the virtual overlay.

18. The apparatus of claim 11, wherein the apparatus receives the new flow notification from another edge node of the Layer-2 mesh via a forwarding path of the Layer-2 mesh.

19. The apparatus of claim 11, wherein the destination address is a MAC address.

20. A tangible, non-transitory, computer-readable medium storing program instructions that cause an edge node of a virtual overlay for a Layer-2 mesh to execute a process comprising:
receiving, at the edge node of the virtual overlay for the Layer-2 mesh, a new flow notification that indicates a destination address for a new flow in the Layer-2 mesh, wherein the virtual overlay is configured to flood replicated frames of the new flow throughout the virtual overlay;
making, by the edge node, a local match between the destination address indicated by the new flow notification and a local address table or group membership of the edge node; and
sending, by the edge node and based on the local match, a match notification that causes other nodes in the virtual overlay to stop flooding replicated frames of the new flow.

* * * * *